(12) United States Patent
Hyland et al.

(10) Patent No.: US 10,761,554 B2
(45) Date of Patent: Sep. 1, 2020

(54) PROPULSIVE DEVICES THAT COMPRISE SELECTIVELY REFLECTIVE EPITAXIAL SURFACES

(71) Applicant: EXCALIBUR ALMAZ USA, INC., Houston, TX (US)

(72) Inventors: David C. Hyland, College Station, TX (US); Arthur M. Dula, Houston, TX (US)

(73) Assignee: Excalibur Almaz USA, Inc., Houston, TX (US)

( * ) Notice: Subject to any disclaimer, the term of this patent is extended or adjusted under 35 U.S.C. 154(b) by 0 days.

(21) Appl. No.: 16/551,614

(22) Filed: Aug. 26, 2019

(65) Prior Publication Data
US 2020/0057463 A1    Feb. 20, 2020

Related U.S. Application Data

(63) Continuation-in-part of application No. 15/555,548, filed on Sep. 4, 2017, now Pat. No. 10,393,095.

(51) Int. Cl.
| | |
|---|---|
| *G05F 3/16* | (2006.01) |
| *H02N 1/00* | (2006.01) |
| *F03G 7/00* | (2006.01) |
| *H02N 11/00* | (2006.01) |

(52) U.S. Cl.
CPC .............. *G05F 3/16* (2013.01); *F03G 7/00* (2013.01); *H02N 1/00* (2013.01); *H02N 11/00* (2013.01)

(58) Field of Classification Search
CPC ........... F03H 3/00; F03H 99/00; H02K 99/20; H01L 49/02; B64G 1/24; B64G 1/409; B64G 1/286; B64G 1/40

USPC ............................................ 60/527–529, 671
See application file for complete search history.

(56) References Cited

U.S. PATENT DOCUMENTS

| | | | | |
|---|---|---|---|---|
| 6,477,028 | B1 * | 11/2002 | Pinto ......................... | F03G 7/00 |
| | | | | 307/151 |
| 7,777,177 | B2 * | 8/2010 | Klotzer ................... | B82Y 10/00 |
| | | | | 250/227.19 |
| 8,647,922 | B2 * | 2/2014 | Zhou ....................... | B82Y 10/00 |
| | | | | 257/E29.001 |
| 9,068,278 | B2 * | 6/2015 | He ........................... | C30B 29/40 |

(Continued)

FOREIGN PATENT DOCUMENTS

GB           2283611 A  *  5/1995  ............... F03G 7/00

*Primary Examiner* — Mark A Laurenzi
*Assistant Examiner* — Mickey H France
(74) *Attorney, Agent, or Firm* — Arthur M. Dula; Law Office of Art Dula

(57) ABSTRACT

A dynamic Casimir effect device for moving reflective surfaces rapidly comprising: an epitaxial stack of a plurality of closely spaced semiconductor lamina; each lamina having a band gap within a range of band gaps between a low band gap value a high band gap value; and a variable voltage source capable of producing a range of output voltages that is electrically connected to the plurality of lamina; wherein each said semiconductor lamina is connected to said voltage source such that said variable voltage source can apply a range of voltages to the plurality of semiconductor lamina and wherein each said semiconductor lamina becomes a reflecting conductor when said variable voltage source applies a specific semiconductor band gap dependent voltage within said range of output voltages to said semiconductor lamina.

13 Claims, 2 Drawing Sheets

(56) References Cited

U.S. PATENT DOCUMENTS

| | | | | |
|---|---|---|---|---|
| 9,530,668 | B2* | 12/2016 | Lee | H01L 29/42384 |
| 2002/0114088 | A1* | 8/2002 | Pinto | H02N 11/006 |
| | | | | 359/831 |
| 2004/0217919 | A1* | 11/2004 | Piehl | B81B 3/0008 |
| | | | | 345/31 |
| 2006/0065622 | A1* | 3/2006 | Floyd | H01L 21/3065 |
| | | | | 216/58 |
| 2006/0165148 | A1* | 7/2006 | Song | H01S 5/183 |
| | | | | 372/99 |
| 2007/0217472 | A1* | 9/2007 | Collins | H01S 5/18391 |
| | | | | 372/50.124 |
| 2007/0241470 | A1* | 10/2007 | Haisch | H02N 11/002 |
| | | | | 264/1.27 |
| 2008/0296437 | A1* | 12/2008 | Cormier | F03H 99/00 |
| | | | | 244/171.5 |
| 2009/0078850 | A1* | 3/2009 | Pinto | G02B 26/0833 |
| | | | | 250/201.9 |
| 2010/0237198 | A1* | 9/2010 | Cormier | B64G 1/24 |
| | | | | 244/171.5 |
| 2011/0073715 | A1* | 3/2011 | Macaulife | B64G 1/409 |
| | | | | 244/171.5 |
| 2011/0116147 | A1* | 5/2011 | Motomura | H01S 5/04254 |
| | | | | 359/204.1 |
| 2012/0138437 | A1* | 6/2012 | Ng | H01H 1/0094 |
| | | | | 200/181 |
| 2013/0307857 | A1* | 11/2013 | Aflatooni | G02B 26/001 |
| | | | | 345/501 |
| 2017/0076822 | A1* | 3/2017 | Caldeira | G11C 23/00 |
| 2017/0200815 | A1* | 7/2017 | Caldeira | H01L 29/66977 |
| 2018/0051680 | A1* | 2/2018 | Hyland | H02K 99/20 |

\* cited by examiner

US 10,761,554 B2

PROPULSIVE DEVICES THAT COMPRISE SELECTIVELY REFLECTIVE EPITAXIAL SURFACES

This application is a continuation in part [CIP] of U. S. patent application Ser. No. 15/555,548, which will issue as U.S. Pat. No. 10,393,095 on Aug. 27, 2019 and claims the benefit of PCT/US/16/20529 and provisional patent application U.S. 62/127,048.

FIELD

The present invention is related generally to propulsive devices that use the dynamic Casimir effect. More particularly, the present invention is related to Casimir effect propulsive devices that comprise selectively reflective epitaxial surfaces.

DOCUMENTS INCORPORATED BY REFERENCE

U.S. patent application Ser. No. 15/555,548 [U.S. Pat. No. 10,393,095]; hereinafter cited as 'Hyland.'

Hyland, D. C.; AN EPITAXIAL DEVICE FOR DYNAMIC INTERACTION WITH THE VACUUM STATE, Journal of the British Interplanetary Society, vol. 70, No. 10/11, pages 394-404, October/November 2017; hereinafter cited as 'JBIS.'

C. M. Wilson, G. Johansson, A. Pourkabirian, J. R. Johansson, T. Duty, F. Nori & P. Delsing; Observation of the Dynamical Casimir Effect in a Superconducting Circuit, arXiv:1105.4714v1 [quant-ph] 24 May 2011; hereinafter cited as 'Wilson.'

Nature, Vol. 479, pages 376-379, Nov. 17, 2011.

'Observation of the dynamical Casimir effect in a superconducting circuit.' hereinafter cited as 'Nature.'

In the event of inconsistent usages between this document and those documents incorporated by reference, the usage in the incorporated reference(s) should be considered supplementary to that of this document; for irreconcilable inconsistencies, the usage in this document controls. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein. A copy of each document incorporated by reference above is attached to and made part of this application in order to support filing of an international PCT application claiming the new matter in this CIP application in PCT states, such as Canada and Europe, that do not permit incorporation by reference in their national phase patent applications.

BACKGROUND

The general background and math/physics description of the present invention is similar to the disclosure made in Hyland supplemented by the disclosure made in JBIS.

The dynamic Casimir effect is a possible mechanism for the transfer of momentum for propulsion. Previous investigations assumed mechanical motion of a mirror to generate thrust. Because of the finite strength of materials and the high frequencies necessary, the amplitudes of motion must be restricted to the nanometer range.

More than 60 years ago, H. B. G. Casimir and Casimir and D. Polder explained the retarded van der Waals force in terms of the zero-point energy of a quantized field. Both the static and dynamic Casimir effects are discussed in large reviews. The dynamic Casimir effect has involved the interaction between moving conductive surfaces functioning as mirrors and the ground state ("vacuum state") of the electromagnetic field.

When estimating the magnitude of the force that could be generated, Maclay and Forward assumed that the amplitude of high frequency motion of an actual mirror must be in the nanometer range due to the finite strength of materials. This restriction limits the possible propulsive force to very small values.

The well-known static Casimir effect between two conductive plates has been shown to produce a force equal to atmospheric pressure at sea level when the two conductive plates are 10 atomic diameters apart. This pressure is a force of over 100,000 pascals. The magnitude of this Casimir force decreases at the 4th power of the increased distance between the conductive plates.

In a thorough treatment of the pressure on moving mirrors due to the Casimir effect, Neto and his colleagues took a perturbative approach consistent with the assumption that the mirror motion be constrained to very small amplitudes. Wilson and Nature demonstrated the dynamical Casimir effect for the first time in 2011 by producing microwave photons by mechanical movement of a conductive surface about a nanometer at about 5% of the speed of light. The invention creates the effect of moving conductive surfaces that are larger at higher velocity and acceleration over a longer distance. Hyland and IBIS disclose and explain the physics of the momentum transfer.

Wilson confirms that the dynamic Casimir effect does exist because photons are produced from the EM ground state. However, the boundary conditions in Wilson confine the field so no net force is produced. The boundary conditions taught in Hyland do not confine the field thus Hyland can produce force

SUMMARY

A dynamic Casimir effect device for moving reflective surfaces rapidly comprising: an epitaxial stack of a plurality of closely spaced semiconductor lamina; each lamina having a band gap within a range of band gaps between a low band gap value a high band gap value; and a variable voltage source capable of producing a range of output voltages that is electrically connected to the plurality of lamina; wherein each said semiconductor lamina is connected to said voltage source such that said variable voltage source can apply a range of voltages over time to the plurality of semiconductor lamina and wherein each said semiconductor lamina becomes a reflecting conductor when said variable voltage source applies a specific semiconductor band gap dependent voltage within said range of output voltages to said semiconductor lamina.

DESCRIPTION

A new feature of an embodiment of the present invention is that the lamina have different band gaps and are arranged so their band gaps are sequentially greater as the lamina are lower in the stack. A band gap is the electrical potential difference between the valence band of electrons and the conduction band. Essentially, the band gap represents the minimum energy that is required to excite an electron up to a state in the conduction band where it can participate in conduction. All lamina are electrically connected to a voltage source at the same time by an electrode plate connected to the side of the stack. The potential of the voltage is changed over time to sequentially cause each lamina to become conductive, moving the conductive region down the stack. The stack is shown as a cube, but it may be any shape, size or form.

As taught by Hyland, the dynamical Casimir effect does not require mechanical motion of a single reflective surface. Hyland teaches that the dynamical Casimir effect is due to the motion of the boundary conditions constraining the free field in its ground state. To understand the efficacy of an embodiment of the present invention one must extend the analysis to large motions made possible using an epitaxial approach; obtain explicit expressions for the forces produced by a particular trajectory of motion; and estimate the numerical values of these forces. Semiconductors used for thin film applications make possible large motions of reflective surfaces without mechanically moving parts.

Figure 1:
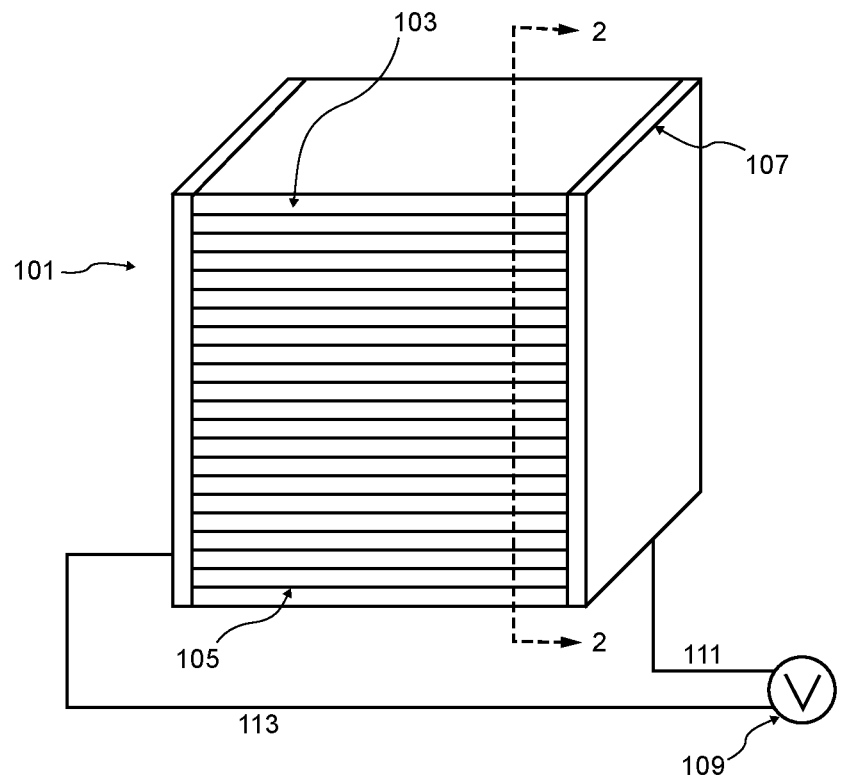
FIG. 1 shows an embodiment comprising an epitaxial stack assembly comprising a plurality of closely spaced semiconductor laminae having a band gap gradient that is electrically connected to a variable voltage source.
Figure 2:
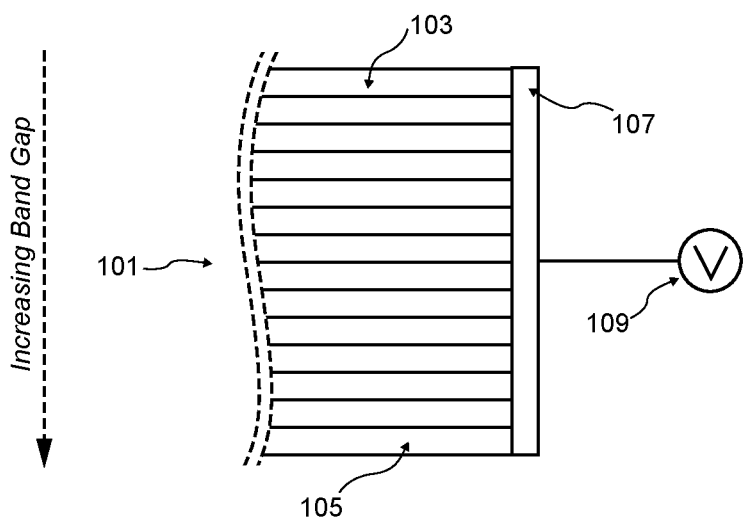
FIG. 2 shows a detail of an edge of the stack assembly shown in FIG. 1 showing the electrical connection of the plurality of lamina in electrical parallel to a edge conductor.

An epitaxial assembly of semiconductor laminae is illustrated in FIG. 1. Without the application of voltage, each lamina from top lamina 103 to bottom lamina 105, which may be a large number of lamina, is a partially transparent dielectric; but when these lamina are connected to a source of sufficient voltage, the lamina becomes a reflecting conductor; with the potential of the required voltage to cause this change being a function of the value of the band gap of each semiconductor lamina. Variable voltage source 109 provides simultaneous voltage input to all lamina from 103 to 105 in the stack by means of conductor 107, which is connected to each lamina and to the voltage source by conductors 111 and 113. FIG. 2 shows a detail of FIG. 1 taken along section lines 2-2, where similar numbers identify similar structures.

Figure 3:
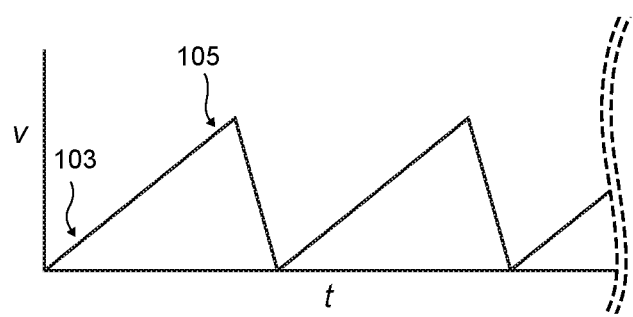
FIG. 3 shows the graph of voltage applied to the lamina as a function of time, showing how variable voltage is applied being repeatedly swept between the voltage required to make the lamina with the smallest band gap conductive and the voltage required to make the lamina with the largest band gap conductive.

Functionally, FIG. 3 is a notational graph showing the output voltage of variable voltage source 109 as a function of time. The output voltage is repetitively increased from the voltage required to make lamina with the smallest band gap 103 conductive to the voltage required to make lamina with the largest band gap 105 conductive. The band gap of each laminas semiconductor material is selected so the band gap of each successive lamina is greater than the preceding lamina and less than the succeeding lamina, thus creating a band gap gradient stack. In another embodiment said band gap gradient may be created within a volume of semiconductor material by changing the amount and composition of the material used to dope the bulk semiconductor as it is grown.

In semiconductors, adding a small amount of energy pushes more electrons into the conduction band, making them more conductive and allowing current to flow like a conductor. Reversing the polarity of this applied energy pushes the electrons into the more widely separated bands, making them insulators and stopping the flow. Since the amount of energy needed to push the electrons between these two levels is very small, semiconductors allow this change with very little energy input. However, this process depends on the electrons being naturally distributed between the two states, so small inputs cause the population statistics to change rapidly. The different band gaps for the lamina of the invention can be selected by using different semiconductor materials or by changing the quality and amount doping of semiconductors, or any combination of these methods. Selection of the best semiconductors is a matter of engineering design choice that is within the ordinary skill of the one skilled in the art of semiconductor materials physics and device design who knows the prior art in the field. Experimentation will allow those skilled in the art to determine the best materials and/or doping to provide semiconductor materials that provide the desired band gap gradient in the device stack. Examples of band gaps for several semiconductors are shown in Table 1.

TABLE 1

| Material | Energy gap (eV) | |
| --- | --- | --- |
| | 0 K | 300 K |
| Si | 1.17 | 1.11 |
| Ge | 0.74 | 0.66 |
| InSb | 0.23 | 0.17 |
| InAs | 0.43 | 0.36 |
| InP | 1.42 | 1.27 |
| GaP | 2.32 | 2.25 |
| GaAs | 1.52 | 1.43 |
| GaSb | 0.81 | 0.68 |
| CdSe | 1.84 | 1.74 |
| CdTe | 1.61 | 1.44 |
| ZnO | 3.44 | 3.2 |
| ZnS | 3.91 | 3.6 |

The band gap for each semiconductor may be adjusted by doping the semiconductor with impurities. Wide band gap semiconductors with a band gap greater than 3 eV and tunable band gap semiconductor alloys are also available to provide a range of band gap values. Thus as the voltage across the lamina stack is increased, the conductive surface moves down the stack as each successive lamina becomes a conductor. The voltage applied can be swept rapidly, moving the conductive mirror surface at high velocities and accelerations without the use of moving parts. This permits motions of the large area reflective surface of the embodiment of the invention that have both high frequencies and large amplitudes over large distances. The result is momentum transfer by the dynamical Casimir effect, as described by Hyland without requirement of applying a voltage source sequentially to each lamina.

An unpublished internal corporate study, 'Specifications for Construction of the Epitaxial Device' [Contract Report Number 3, Dr. D. C. Hyland, Jun. 11, 2018] the is attached and incorporated by reference to provide general mathematical justification and notational specifications and requirements without a specific designation of the means for controlling the reflectivity of the laminae.

Beginning of Contract Report Number 3

Introduction

This study addresses experimental investigation of the author's invention "An Epitaxial device for Momentum Exchange with the Vacuum State" which uses the dynamic Casimir effect to transfer momentum to an object via interaction with the electromagnetic field ground state. Specifically, the present work is directed toward preparing the specifications and requirements that would enable a semiconductor, or liquid crystal fabrication firm to build a small-scale test unit of the invention.

The Effort is Divided into Four Tasks:

1. Thoroughly review and correct, as necessary, the theoretical analysis of the force that can be produced by the device, particularly for the unrestricted (large) amplitude case.

2. Perform design trade-off comparisons, determining force capability, size, dimensions of the laminae, wavelength range, power requirements, etc.

3. Researching the literature to identify semiconductor or liquid crystal devices for which there is a wavelength range where the device can be switched from reflector to transparency, and vice versa. Estimate the achievable active wavelength band and switching frequency.

4. With a preliminary design, based upon Tasks (2) and (3), formulate the specifications for the manufacturer.

The theoretical review of the fundamental concepts of the epitaxial device was presented at the Advanced Propulsion Workshop held at the Aerospace Corporation, El Segundo, Calif., Nov. 1-3, 2017, and published as the paper "An Epitaxial Device for Dynamic Interaction with the Vacuum State" in the Journal of the British Interplanetary Society. This paper constituted the first report under this contract. In the second report, we considered the details of the lamina switching algorithm since this topic has considerable impact on the performance specifications developed in this effort. The notations, conventions and basic definitions are those introduced in the first report. In this report, we complete the specifications for manufacture of the epitaxial device. The following is understood to be a separate document that can be submitted to manufacturers.

Fundamental Component of the Epitaxial Device

Figure 4:
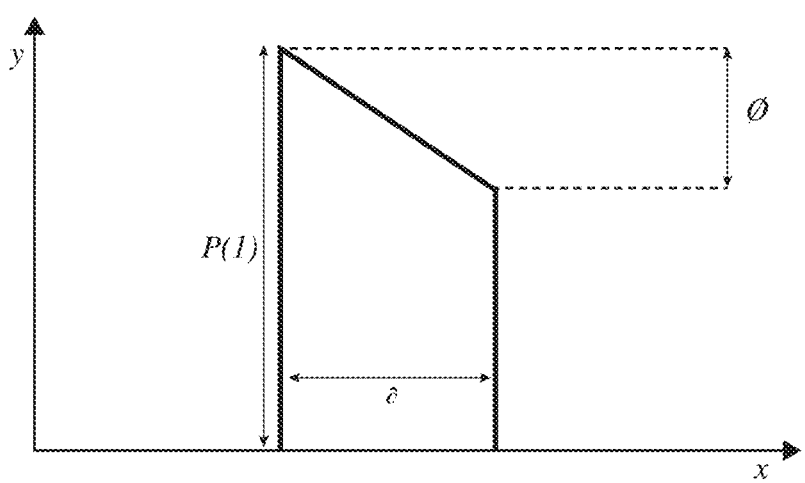
FIG. 4 shows the profile of the spatial distribution of the conductivity of a lamina for a given energizing input.

The basic component is a lamina. The individual lamina is a thin sheet of thickness $\delta$ such that with the application of an energizing input (denoted by P (t)) the sheet transitions from a transparency of $t_l$ ($\cong 1$) to a reflectivity of $r_l$ ($\cong 1$) within an effective wavelength range of $\lambda_L$ to $\lambda_U$ ($\lambda_U > \lambda_L$). The energizing input may be current or voltage, and its application to the lamina may produce a transition from reflectivity to transparency, as well as vice-versa. The underlying physical mechanism may be any effect that produces the desired degrees of transparency/reflectivity within the required switching time period—e.g. modulation of semiconductor conductivity, or an electro-optic effect with Chiral liquid crystals, etc. In the following description, we presume that the energizing input produces a proportional adjustment in conductivity, denoted by $\sigma$ (so that the electric field obeys the generalized wave equation), but if other types of reflective mechanisms are used, they may be adjusted so that an equivalent effect is introduced. With the above assumptions, the conductivity within each lamina must be graded. That is, with a nonzero input, P (t), the conductivity must vary linearly through the thickness of the lamina. Refer to FIG. 4, where the x axis is perpendicular to the lamina, and the surface parallel to the y-z plane. We label the direction along x (opposite to x) the forward direction (backward direction). The distribution of conductivity for a given value of P (t) is required to be:

$$\sigma(x,t) = P(t)(1-\theta x/\delta), \quad 0 \leq x \leq \delta$$

In other words, for any positive input, the conductivity declines downward in the forward direction. The rate of forward decline is determined by the positive constant, $\theta$, which is the same for all the laminae in the epitaxial device and is part of their intrinsic material properties. Below we specify a relation between $\theta$ and the required time history of the input P (t).

Construction of the Epitaxial Device

As a whole, the epitaxial device consists of $N_l$ identical laminae bonded together on their x-y plane surfaces to form a stack, each lamina occupying a distinct, evenly spaced position along the x-axis. The bonding of the laminae should be optically continuous. We denote the total thickness of the stack by $\overline{Z}$. Each lamina has the gradient of its conductivity facing the negative x direction, as in FIG. 4 In this description we label the several laminae from 1 to $N_l$, progressing in the forward direction. Thus the total thickness of the stack is $N_l \delta$. The figure of the stack in the x-y place can be a circle or square, the length or diameter being denoted, in either case, by $L_l$. Each lamina is to have a separate lead with which to give it an individual energizing input. Thus, the separate inputs are labeled as $P_k$ (t); k=1, . . . , $N_l$.

Lamina Switching Concept

Each lamina is to receive a particular energizing input signal. Each such signal is repetitive, all signals having a common period, denoted by $\tau_R$. As mentioned, it is assumed that within certain wavelength bands, the reflectivity of each lamina can be set within a continuous range from completely reflective to completely transparent. We denote the conductivity needed to produce the desired maximum reflectivity by $\sigma_l^{max}$. The spatial-temporal pattern of the conductivity (and reflectivity) has two portions: (A) a forward portion, (B) shut-off portion.

Figure 5:
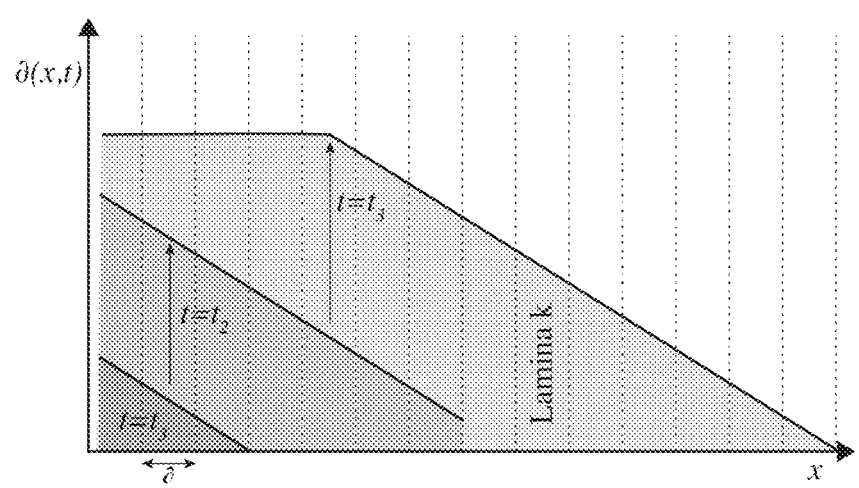
FIG. 5 shows the spatial-temporal progression of laminae reflectivities for the forward portion of the switching cycle.
Figure 6:
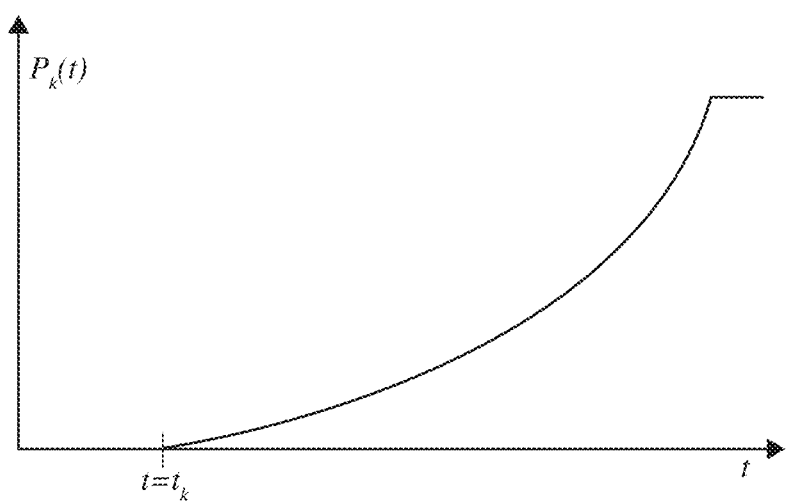
FIG. 6 shows the time history of the energizing input to lamina k. The forward portion is quadratic in $(t-t_{dk})$.

The forward portion involves an echelon distribution of reflectivity moving with accelerating speed along the positive x-axis, as illustrated in the FIGS. 5 shows the spatial-temporal progression of laminae reflectivities for the forward portion of the switching cycle and FIG. 6 shows the time history of the energizing input to lamina k. The forward portion is quadratic in (t-$t_{dk}$).

The initiation time is defined as t=0. The duration of the forward motion is denoted by T. Let $x_k$=(k-1) $\delta$, k=1, . . . , $N_l$ be the position of the left-hand surface of the $k^{th}$ lamina. Then the required conductivity in the $k^{th}$ lamina is given by:

$$\sigma(x_k, t) = \begin{cases} 0, & \overline{Z}\left(\frac{t}{T}\right)^2 - x_k \frac{\theta}{\delta} \leq 0 \\ \overline{Z}\left(\frac{t}{T}\right)^2 - x_k \frac{\theta}{\delta}, & \overline{Z}\left(\frac{t}{T}\right)^2 - x_k \frac{\theta}{\delta} > 0 \ \& \ \sigma(x_k) < \sigma_l^{max} \\ \sigma_l^{max}, & \overline{Z}\left(\frac{t}{T}\right)^2 - x_k \frac{\theta}{\delta} > \sigma_l^{max} \end{cases}$$

It is assumed that the time needed to form the initial echelon profile attaining a maximum of $\sigma = \sigma_l^{max}$ is no more than T/4.

Note: It is important that the conductivity grading be accurate enough so that the conductivity on the right surface of a lamina does not differ more than a small fraction of the conductivity of the left surface of its right-hand neighbor.

More succinctly, if we define a time delay for the $k^{th}$ lamina:

$$\frac{t_{dk}}{T} = \sqrt{\frac{x_k \theta}{\overline{Z}\delta}}$$

we can state:

$$P_k(t) = \begin{cases} 0, t < t_{dk} \\ \frac{\overline{Z}}{T^2}(t-t_{dk})(t+t_{dk}), t \geq t_{dk} \ \& \sigma(x_k) < \sigma_l^{max} \\ \sigma_l^{max}, \frac{\overline{Z}}{T^2}(t^2 - t_{dk}^2) > \sigma_l^{max} \end{cases}$$

The shut-off portion begins when the $\sigma = \sigma_l^{max}$ zone reaches $X = \overline{Z}$ at time $t = T$. Subsequently, there are several possibilities. For example, it suffices to reduce the energizing signals linearly so that the reflectivity is zero at time $t = 2T$. Thus, the frequency of all the energizing signals (in Hertz) is:

$$\Omega = 1/2T$$

And the maximum speed of the reflective front is:

$$\overline{V} = 2\frac{\delta}{\theta}\frac{\overline{Z}}{T}$$

For example, if this speed were that of light, and $\delta/\theta \cong 5$ and $\overline{Z} = 5$ cm, then $\Omega \cong 300$ MHz Table 2 lists the desired values of the various numerical parameters defined herein.

TABLE 2

Nominal Requirements for Parameter Values

| Quantity | Definition | Nominal Value |
|---|---|---|
| δ | Lamina thickness | 5 mm |
| $\lambda_U$ | Upper end of the effective wavelength range | 0.2 μm |
| $\lambda_L$ | Lower end of the active wave number range | 0.03 μm |
| Ω | Energizing input wave form frequency | 300 MHz |
| $\tau_R$ | Minimum switching pulse rise time | 1 ns |
| $\overline{V}$ | Maximum speed in the energizing input profile | 0.95 c |
| $\overline{Z}$ | Thickness of the epitaxial device | 6 cm |
| $N_l$ | Number of lamiae | >10 |
| θ | Conductivity grading | δ/5 |
| $r_l$ | Maximum lamina reflectivity | >0.98 |
| $t_l$ | Unenergized lamina transparency | 0.995 |
| $L_l$ | Circular lamina diameter | 14 cm |

End of Contract Report Number 3

This report states "Each lamina is to have a separate lead with which to give it an individual energizing input." This is taught by Hyland. This study is useful to provide general mathematical justification for force production by the invention and notational specifications and requirements for an experimental device stack, regardless of the means for controlling the reflectivity of the laminae.

The specific embodiments disclosed above do not limit the scope of the invention, which should be limited only by the claims below and their equivalents.

The invention claimed is:

1. A dynamic Casimir effect device for moving reflective surfaces rapidly comprising: an epitaxial stack of a plurality of closely spaced semiconductor lamina; each lamina having a band gap in a range of band gaps between a low band gap value and a high band gap value creating a band gap gradient in said stack; and a variable voltage source capable of producing a range of output voltages that is electrically connected to the plurality of lamina; wherein each said semiconductor lamina is connected to said voltage source such that said variable voltage source can apply a range of voltages to the plurality of semiconductor lamina.

2. The device as in claim 1 wherein each said semiconductor lamina becomes a reflecting conductor when said variable voltage source applies a specific semiconductor band gap dependent voltage within said range of output voltages to said semiconductor lamina.

3. The device as in claim 2 wherein each said semiconductor lamina is a partially transparent dielectric when a voltage below said specific voltage is applied to said semiconductor lamina.

4. The device as in claim 3 wherein the plurality of lamina in said epitaxial stack are arranged in sequential order by the value of each lamina's semiconductor band gap.

5. The device as in claim 4 wherein said variable voltage source is connected electrically to all the lamina in said stack and said variable output voltage range is capable of applying said specific semiconductor band gap dependent voltage for each lamina.

6. The device as in claim 5 wherein said variable voltage source sequentially applies a time dependent variable voltage to the lamina in the epitaxial stack such that each of said plurality of lamina sequentially becomes a reflecting conductor.

7. The device as in claim 6 wherein said application of said variable voltage to said semiconductor lamina produces a moving reflective surface.

8. The device as in claim 7 wherein said plurality of semiconductor lamina are sufficiently closely spaced that the reflective surface motion can be treated as continuous.

9. The device as in claim 8 wherein said semiconductor lamina are each less than one millimeter thick.

10. The device as in claim 7 wherein said moving reflective surface moves at least at 5% of the speed of light.

11. The device as in claim 6 wherein said voltage source can apply range of voltage to each semiconductor lamina to create continuous motion of a front of charge carrier density.

12. The device as in claim 6 wherein said voltage source can apply voltage to each semiconductor lamina in succession such that said device generates a reflective surface that moves in rapid, large amplitude motion.

13. The device as in claim 1 wherein said band gap gradient in the stack is created by doping the stack.

* * * * *